(12) United States Patent
Kellermann et al.

(10) Patent No.: US 8,595,285 B2
(45) Date of Patent: Nov. 26, 2013

(54) TRANSMISSION SCHEME FOR TEXT-BASED INFORMATION

(75) Inventors: Christian Kellermann, Nuremberg (DE); Bernd Linz, Erlangen (DE); Markus Prosch, Erlangen (DE); Alexander Zink, Stegaurach (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 13/273,550

(22) Filed: Oct. 14, 2011

(65) Prior Publication Data

US 2012/0185526 A1 Jul. 19, 2012

Related U.S. Application Data

(63) Continuation of application No. PCT/EP2010/054725, filed on Apr. 19, 2010.

(30) Foreign Application Priority Data

Apr. 14, 2009 (EP) .................................... 09005332
May 26, 2009 (EP) .................................... 09007012

(51) Int. Cl.
*G06F 15/16* (2006.01)

(52) U.S. Cl.
USPC ......................................... 709/201; 709/232

(58) Field of Classification Search
USPC .......... 709/201, 204–207, 230–236; 370/229, 370/351, 389, 392, 400, 401, 464, 471, 474
See application file for complete search history.

(56) References Cited

U.S. PATENT DOCUMENTS 7,411,902 B2 * 8/2008 Kumar et al. ................. 370/230

2002/0051466 A1 * 5/2002 Bruckman ..................... 370/474
2003/0056009 A1 * 3/2003 Mizrachi et al. .............. 709/245

(Continued)

FOREIGN PATENT DOCUMENTS

| JP | 2003244233 | 8/2003 |
| JP | 2004510279 | 4/2004 |
| WO | WO-02/29602 | 4/2002 |
| WO | WO-2008/017973 | 2/2008 |

OTHER PUBLICATIONS

"Committee Draft of MPEG-4 stream text format", Information Technology, Coding of audio-visual objects—Part 17: Streaming Text Format; ISO/IEC JTC1/SC29/WG11 N5782, Jul. 2003, 10 pages.
Exposito, et al., "Building self-optimized communication systems based on applicative cross-layer information", Computer Standards and Interfaces vol. 31, No. 2, Feb. 2009, pp. 354-361.

(Continued)

*Primary Examiner* — Ruolei Zong
(74) *Attorney, Agent, or Firm* — Michael A. Glenn; Perkins Coie LLP

(57) ABSTRACT

A text-based information transmission is made complying with a greater number of transport-layer systems by performing the fragmentation and de-fragmentation of the information object at the application-layer side rather than at transport-layer domain. By this manner, the text-based information service is not restricted to transport-layer systems accommodating the maximum size of the information objects. Rather, it is possible to adjust the fragmentation size of the fragments into which the information objects are fragmented to the maximum transport packet content section size offered by the transport layer within the application layer. The fragment size may even vary in a time-varying manner responsive to instructions from the transport layer posed onto the transport layer in consequence of time-varying transmission channel characteristics, for example.

14 Claims, 4 Drawing Sheets

(56) References Cited

U.S. PATENT DOCUMENTS

| | | |
|---|---|---|
| 2003/0142823 A1 | 7/2003 | Swander et al. |
| 2004/0028049 A1 | 2/2004 | Wan et al. |
| 2005/0152355 A1* | 7/2005 | Henriques ............... 370/389 |
| 2006/0184790 A1* | 8/2006 | Oliveira et al. ............ 713/160 |
| 2009/0024753 A1 | 1/2009 | Mammen |

OTHER PUBLICATIONS

Girardot, et al., "Efficient Representation and Streaming of XML Content Over the Internet Medium", IEEE International Conference Multimedia and Expo on New York, NY, USA vol. 1, Jul. 30-Aug. 2, 2000, pp. 67-70.

Van Der Meer, Jan , "White Paper on Streaming Text—MPEG-4 part 17", ISOIEC JTC1/SC29/VVG11 N7515, Jul. 2005, 3 pages.

* cited by examiner

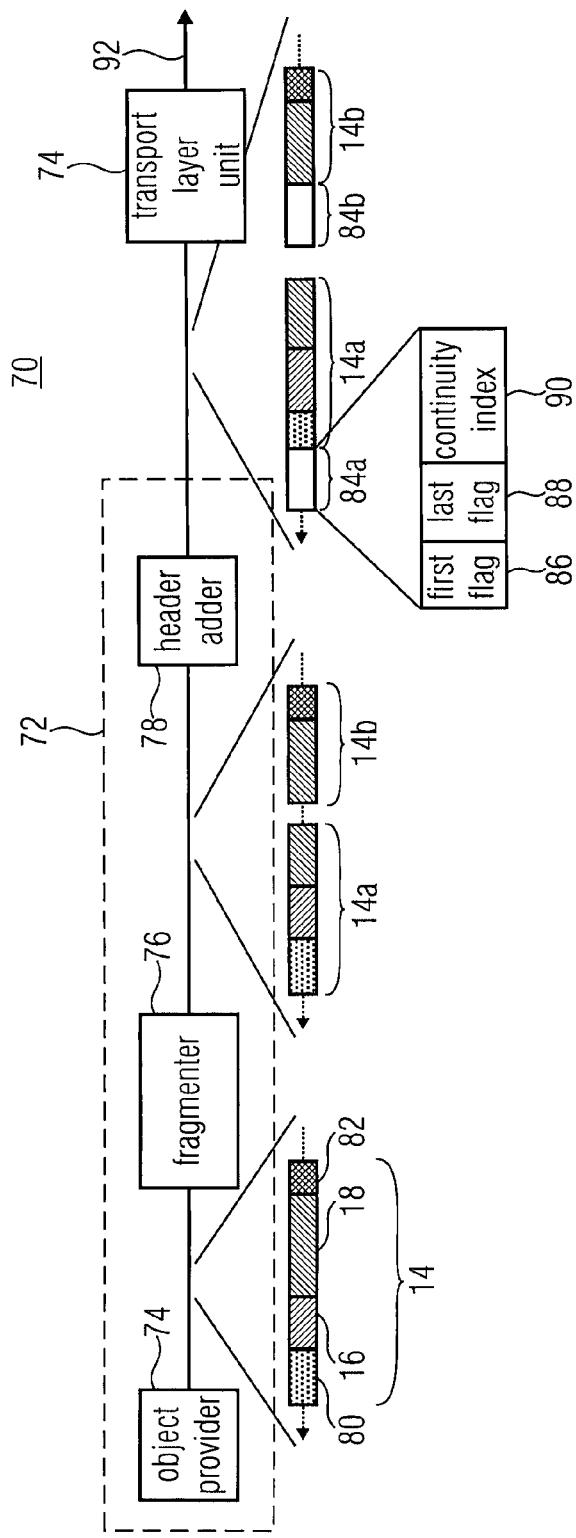
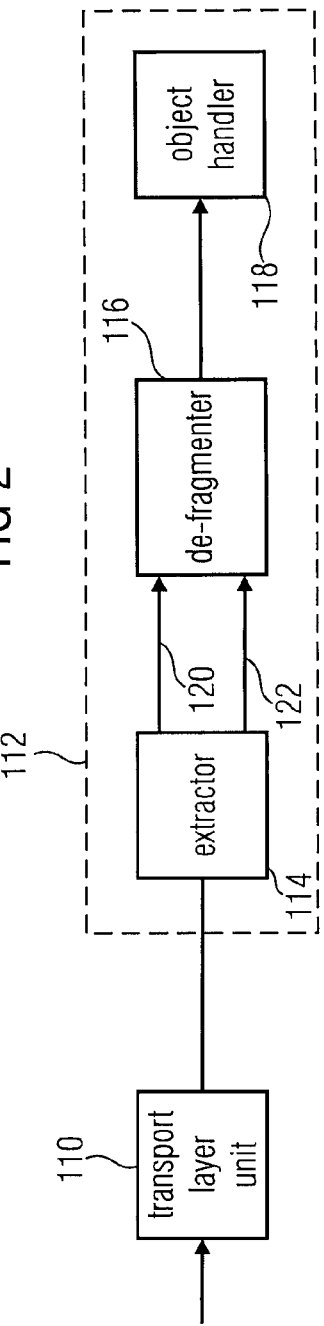
FIG 2
FIG 3

TRANSMISSION SCHEME FOR TEXT-BASED INFORMATION

CROSS-REFERENCE TO RELATED APPLICATIONS

This application is a continuation of copending International Application No. PCT/EP2010/054725, filed Apr. 9, 2010, which is incorporated herein by reference in its entirety, and additionally claims priority from European Application No. EP 09005332.3, filed Apr. 14, 2009, EP 09007012.9, filed May 26, 2009, all of which are incorporated herein by reference in their entirety.

BACKGROUND OF THE INVENTION

The present application relates to a transmission scheme for text-based information such as, for example, data-carousel text-based information broadcasting an example for which is the XML-based low-profile information service Journaline (R).

Text-based information signals carrying text-based information content distributed to information objects are used, for example, in data-carousel text-based information broadcasting systems, in data transmissions where the textual information contents are transferred on demand, or in address-based data transmissions directed to specified addressees which may or may not ordered the transmission by demand.

Data carousel text-based information broadcasting, for example, enables text-based information to be distributed to a huge amount of users while keeping the technical overhead reasonably low. For example, no uplink or feedback signals from the receivers to the broadcast transmitter is needed. In order to enable the users to individually navigate through the information content provided by the broadcast signal according to their personal preferences, the whole information is divided-up into objects referring to other objects, thereby enabling interactively navigating through the resulting linked arrangement of objects. For example, menu objects enable the user to select, among menu items, in order to proceed from one object to the other.

When considering the transmission of a text-based information signal, care should be taken to distinguish between the transport layer on the one hand and the application layer on the other hand. That is, the text-based information service provides for the text information objects into which the text-based information content is distributed. Obviously, these information objects may have different lengths. These information objects have to be transmitted to the service recipients. This falls into the responsibility of the transport layer system, i.e. the system interfacing the service transmitter and the service recipients/receivers. The transport layer defines the way the data to be transmitted or transported is to be passed on from the application layer to the transport layer and how the data is then passed on from the transport layer to the application layer at the recipient's side. For example, the transport layer may expect to receive the data to be transmitted in form of packets. Alternatively, the transport layer may allow a stream of data to be passed on to the transport layer at the transmission's side. In case of text-based information transmission by way of information objects, the service recipient expects to receive the application layer data in units of information objects. This, in turn, means that the transport layer has to be able to cope with the maximum size of the information objects, allowed by the text-based information service. That is, the transport layer has to be defined such that the information objects of maximum size fit into the content section of the transport packet of the transport layer, or the transport layer has to be able to handle inbound information objects having a size greater than the maximum size of the content section of the transport packets with then, at the recipient's side, re-combining the sub-portions of these information objects so that the fragmented transport is transparent for the service recipient.

This, however, means that the information service and the respective service receivers are merely applicable in connection with transport layer systems which comply with the afore-mentioned requirements. This, however, restricts the applicability of the respective service.

SUMMARY

According to an embodiment, an application-layer unit for receiving a text-information signal carrying text-based information content being distributed to information objects in form of a sequence of transport units may have an extractor for inspecting each transport unit and extracting a fragment header and a corresponding fragment section therefrom so as to acquire a sequence of fragment sections with associated fragment headers; a de-fragmenter for de-fragmenting the sequence of fragment sections by use of the fragment headers to acquire the information objects with, at least for a part of the information objects, composing the respective information object from a sub-sequence of fragment sections of the sequence of fragment sections; and an information object handler for parsing the information object to acquire an object header and an object content section and processing the information objects according to the object header, wherein the fragment headers associated with the sequence of the fragment sections are configured such that the fragment headers reveal as to whether the associated fragment section is the first fragment section of a sub-sequence of fragment sections into which an information object is fragmented; the fragment headers reveal as to whether the associated fragment section is the last fragment section of a sub-sequence of fragment sections into which an information object is fragmented; and the fragment headers of a sub-sequence of fragment sections into which an information object is fragmented comprise a continuity index continuously changing from the first to the last fragment section of the sub-sequence of fragment sections, wherein the de-fragmenter is configured to perform the de-fragmentation by a) checking the fragment header with which a current fragment section is associated as to whether the current fragment section is the first fragment section of a sub-sequence of fragment sections, b) if so, check the fragment header of the current fragment section and the fragment headers associated with a run of fragment sections immediately following the current fragment section and ending at the fragment section immediately preceding a fragment section comprising a fragment header associated therewith which indicates that its fragment section is the first fragment section of a sub-sequence of fragment sections, or at a fragment section that comprises a fragment header associated therewith that indicates that its fragment section is the last fragment section of a sub-sequence of fragment sections, whatever occurs first in the sequence of fragment sections, as to whether there is a discontinuity in the continuity index of these fragment headers; c) if there is a discontinuity in the continuity index of these fragment headers or if the run ends at a fragment section that comprises a fragment header associated therewith that does not indicate that its fragment section is the last fragment section of a sub-sequence of fragment sections, discarding the current fragment section on the run of fragment sections and resuming the de-frequentation at step a) with the fragment section immediately following the run of fragment sections as the current fragment section; and d) otherwise, composing the information object from the current fragment section and the run of fragment sections.

According to another embodiment, a receiver for a text-information signal carrying text-based information content being distributed to information objects may have a transport-layer unit for receiving a transport signal so as to acquire a sequence of transport units; an application-layer unit for receiving a text-information signal carrying text-based information content being distributed to information objects in form of a sequence of transport units which may have an extractor for inspecting each transport unit and extracting a fragment header and a corresponding fragment section therefrom so as to acquire a sequence of fragment sections with associated fragment headers; a de-fragmenter for de-fragmenting the sequence of fragment sections by use of the fragment headers to acquire the information objects with, at least for a part of the information objects, composing the respective information object from a sub-sequence of fragment sections of the sequence of fragment sections; and an information object handler for parsing the information object to acquire an object header and an object content section and processing the information objects according to the object header, wherein the fragment headers associated with the sequence of the fragment sections are configured such that the fragment headers reveal as to whether the associated fragment section is the first fragment section of a sub-sequence of fragment sections into which an information object is fragmented; the fragment headers reveal as to whether the associated fragment section is the last fragment section of a sub-sequence of fragment sections into which an information object is fragmented; and the fragment headers of a sub-sequence of fragment sections into which an information object is fragmented comprise a continuity index continuously changing from the first to the last fragment section of the sub-sequence of fragment sections, wherein the de-fragmenter is configured to perform the de-fragmentation by a) checking the fragment header with which a current fragment section is associated as to whether the current fragment section is the first fragment section of a sub-sequence of fragment sections, b) if so, check the fragment header of the current fragment section and the fragment headers associated with a run of fragment sections immediately following the current fragment section and ending at the fragment section immediately preceding a fragment section comprising a fragment header associated therewith which indicates that its fragment section is the first fragment section of a sub-sequence of fragment sections, or at a fragment section that comprises a fragment header associated therewith that indicates that its fragment section is the last fragment section of a sub-sequence of fragment sections, whatever occurs first in the sequence of fragment sections, as to whether there is a discontinuity in the continuity index of these fragment headers; c) if there is a discontinuity in the continuity index of these fragment headers or if the run ends at a fragment section that comprises a fragment header associated therewith that does not indicate that its fragment section is the last fragment section of a sub-sequence of fragment sections, discarding the current fragment section on the run of fragment sections and resuming the de-frequentation at step a) with the fragment section immediately following the run of fragment sections as the current fragment section; and d) otherwise, composing the information object from the current fragment section and the run of fragment sections.

According to another embodiment, an application-layer unit for transmitting a text-based information signal carrying text-based information content being distributed to information objects in form of a sequence of transport units within a transport signal may have a fragmenter for fragmenting the information objects into a sequence of fragment sections with, at least for a part of the information objects, fragmentising the respective information objects into a sub-sequence of fragment sections of the sequence of fragment sections; and a header adder for providing each fragment section with a fragment header allowing a de-fragmentation of the fragment sections to acquire the information objects, each fragment section and the fragment header the respective fragment section is associated with, forming a transport unit, wherein the header adder is configured such that fragment headers associated with the sequence of the fragment sections are configured such that the fragment headers reveal as to whether the associated fragment section is the first fragment section of a sub-sequence of fragment sections into which an information object is fragmented; the fragment headers reveal as to whether the associated fragment section is the last fragment section of a sub-sequence of fragment sections into which an information object is fragmented; and the fragment headers of a sub-sequence of fragment sections into which an information object is fragmented comprise a continuity index continuously changing from the first to the last fragment section of the sub-sequence of fragment sections.

According to another embodiment, a transmitter for a text-based information signal carrying text-based information content being distributed to information objects may have an application-layer unit for transmitting a text-based information signal carrying text-based information content being distributed to information objects in form of a sequence of transport units within a transport signal, which may have a fragmenter for fragmenting the information objects into a sequence of fragment sections with, at least for a part of the information objects, fragmentising the respective information objects into a sub-sequence of fragment sections of the sequence of fragment sections; and a header adder for providing each fragment section with a fragment header allowing a de-fragmentation of the fragment sections to acquire the information objects, each fragment section and the fragment header the respective fragment section is associated with, forming a transport unit, wherein the header adder is configured such that fragment headers associated with the sequence of the fragment sections are configured such that the fragment headers reveal as to whether the associated fragment section is the first fragment section of a sub-sequence of fragment sections into which an information object is fragmented; the fragment headers reveal as to whether the associated fragment section is the last fragment section of a sub-sequence of fragment sections into which an information object is fragmented; and the fragment headers of a sub-sequence of fragment sections into which an information object is fragmented comprise a continuity index continuously changing from the first to the last fragment section of the sub-sequence of fragment sections; and a transport-layer unit for transmitting, transport unit-wise, the sequence of transport units within a transport signal.

According to another embodiment, a transport signal may have a text-based information signal carrying text-based information content being distributed to information objects in form of a sequence of transport units, each transport unit being comprising a fragment header and a corresponding fragment section, the fragment headers allowing a de-fragmentation of the sequence of fragment sections to acquire the information objects therefrom, wherein, at least for a part of the information objects, the respective information object is distributed to a sub-sequence of fragment sections of the sequence of fragment sections, wherein the fragment headers associated with the sequence of the fragment sections are configured such that the fragment headers reveal as to whether the associated fragment section is the first fragment section of a sub-sequence of fragment sections into which an information object is fragmented; the fragment headers reveal as to whether the associated fragment section is the last fragment section of a sub-sequence of fragment sections into which an information object is fragmented; and the fragment headers of a sub-sequence of fragment sections into which an information object is fragmented comprise a continuity index continuously changing from the first to the last fragment section of the sub-sequence of fragment sections.

According to another embodiment, a method for, at an application layer, receiving a text-information signal carrying text-based information content being distributed to information objects in form of a sequence of transport units, may have the steps of inspecting each transport unit and extracting a fragment header and a corresponding fragment section therefrom so as to acquire a sequence of fragment sections with associated fragment headers; de-fragmenting the sequence of fragment sections by use of the fragment headers to acquire the information objects with, at least for a part of the information objects, composing the respective information object from a sub-sequence of fragment sections of the sequence of fragment sections; and parsing the information object to acquire an object header and an object content section and processing the information objects according to the object header, wherein the fragment headers associated with the sequence of the fragment sections are configured such that the fragment headers reveal as to whether the associated fragment section is the first fragment section of a sub-sequence of fragment sections into which an information object is fragmented; the fragment headers reveal as to whether the associated fragment section is the last fragment section of a sub-sequence of fragment sections into which an information object is fragmented; and the fragment headers of a sub-sequence of fragment sections into which an information object is fragmented comprise a continuity index continuously changing from the first to the last fragment section of the sub-sequence of fragment sections, wherein the de-fragmentation is performed by a) checking the fragment header with which a current fragment section is associated as to whether the current fragment section is the first fragment section of a sub-sequence of fragment sections, b) if so, check the fragment header of the current fragment section and the fragment headers associated with a run of fragment sections immediately following the current fragment section and ending at the fragment section immediately preceding a fragment section comprising a fragment header associated therewith which indicates that its fragment section is the first fragment section of a sub-sequence of fragment sections, or at a fragment section that comprises a fragment header associated therewith that indicates that its fragment section is the last fragment section of a sub-sequence of fragment sections, whatever occurs first in the sequence of fragment sections, as to whether there is a discontinuity in the continuity index of these fragment headers; c) if there is a discontinuity in the continuity index of these fragment headers or if the run ends at a fragment section that comprises a fragment header associated therewith that does not indicate that its fragment section is the last fragment section of a sub-sequence of fragment sections, discarding the current fragment section on the run of fragment sections and resuming the de-frequentation at step a) with the fragment section immediately following the run of fragment sections as the current fragment section; and d) otherwise, composing the information object from the current fragment section and the run of fragment sections.

According to another embodiment, a method for, at an application layer, transmitting a text-based information signal carrying text-based information content being distributed to information objects in form of a sequence of transport units within a transport signal, may have the steps of fragmenting the information objects into a sequence of fragment sections with, at least for a part of the information objects, fragmentising the respective information objects into a sub-sequence of fragment sections of the sequence of fragment sections; and providing each fragment section with a fragment header allowing a de-fragmentation of the fragment sections to acquire the information objects, each fragment section and the fragment header the respective fragment section is associated with, forming a transport unit, wherein the provision of each fragment section with a fragment header is performed such that fragment headers associated with the sequence of the fragment sections are configured such that the fragment headers reveal as to whether the associated fragment section is the first fragment section of a sub-sequence of fragment sections into which an information object is fragmented; the fragment headers reveal as to whether the associated fragment section is the last fragment section of a sub-sequence of fragment sections into which an information object is fragmented; and the fragment headers of a sub-sequence of fragment sections into which an information object is fragmented comprise a continuity index continuously changing from the first to the last fragment section of the sub-sequence of fragment sections.

According to another embodiment, a computer program may have instructions for performing, when running on a computer, a method for, at an application layer, receiving a text-information signal carrying text-based information content being distributed to information objects in form of a sequence of transport units, the method having the steps of inspecting each transport unit and extracting a fragment header and a corresponding fragment section therefrom so as to acquire a sequence of fragment sections with associated fragment headers; de-fragmenting the sequence of fragment sections by use of the fragment headers to acquire the information objects with, at least for a part of the information objects, composing the respective information object from a sub-sequence of fragment sections of the sequence of fragment sections; and parsing the information object to acquire an object header and an object content section and processing the information objects according to the object header, wherein the fragment headers associated with the sequence of the fragment sections are configured such that the fragment headers reveal as to whether the associated fragment section is the first fragment section of a sub-sequence of fragment sections into which an information object is fragmented; the fragment headers reveal as to whether the associated fragment section is the last fragment section of a sub-sequence of fragment sections into which an information object is fragmented; and the fragment headers of a sub-sequence of fragment sections into which an information object is fragmented comprise a continuity index continuously changing from the first to the last fragment section of the sub-sequence of fragment sections, wherein the de-fragmentation is performed by a) checking the fragment header with which a current fragment section is associated as to whether the current fragment section is the first fragment section of a sub-sequence of fragment sections, b) if so, check the fragment header of the current fragment section and the fragment headers associated with a run of fragment sections immediately following the current fragment section and ending at the fragment section immediately preceding a fragment section comprising a fragment header associated therewith which indicates that its fragment section is the first fragment section of a sub-sequence of fragment sections, or at a fragment section that comprises a fragment header associated therewith that indicates that its fragment section is the last fragment section of a sub-sequence of fragment sections, whatever occurs first in the sequence of fragment sections, as to whether there is a discontinuity in the continuity index of these fragment headers; c) if there is a discontinuity in the continuity index of these fragment headers or if the run ends at a fragment section that comprises a fragment header associated therewith that does not indicate that its fragment section is the last fragment section of a sub-sequence of fragment sections, discarding the current fragment section on the run of fragment sections and resuming the de-frequentation at step a) with the fragment section immediately following the run of fragment sections as the current fragment section; and d) otherwise, composing the information object from the current fragment section and the run of fragment sections.

According to another embodiment, a computer program may have instructions for performing, when running on a computer, a method for, at an application layer, transmitting a text-based information signal carrying text-based information content being distributed to information objects in form of a sequence of transport units within a transport signal, the method having the steps of fragmenting the information objects into a sequence of fragment sections with, at least for a part of the information objects, fragmentising the respective information objects into a sub-sequence of fragment sections of the sequence of fragment sections; and providing each fragment section with a fragment header allowing a de-fragmentation of the fragment sections to acquire the information objects, each fragment section and the fragment header the respective fragment section is associated with, forming a transport unit, wherein the provision of each fragment section with a fragment header is performed such that fragment headers associated with the sequence of the fragment sections are configured such that the fragment headers reveal as to whether the associated fragment section is the first fragment section of a sub-sequence of fragment sections into which an information object is fragmented; the fragment headers reveal as to whether the associated fragment section is the last fragment section of a sub-sequence of fragment sections into which an information object is fragmented; and the fragment headers of a sub-sequence of fragment sections into which an information object is fragmented comprise a continuity index continuously changing from the first to the last fragment section of the sub-sequence of fragment sections.

The present invention is based on the finding that the text-based information transmission complies with a greater number of transport-layer systems when the fragmentation and de-fragmentation of the information object is performed at the application-layer side rather than at transport-layer domain. By this manner, the text-based information service is not restricted to transport-layer systems accommodating the maximum size of the information objects. Rather, it is possible to adjust the fragmentation size of the fragments into which the information objects are fragmented to the maximum transport packet content section size offered by the transport layer within the application layer. The fragment size may even vary in a time-varying manner responsive to instructions from the transport layer posed onto the transport layer in consequence of time-varying transmission channel characteristics, for example.

BRIEF DESCRIPTION OF THE DRAWINGS

Embodiments of the present invention are described in the following in more detail with regard to the Figs. In particular:

FIG. 2 a block diagram for a text-based information signal according to an embodiment;

FIG. 3 a block diagram of a receiver for a text-based information signal according to an embodiment.

DETAILED DESCRIPTION OF THE INVENTION

Figure 1A:
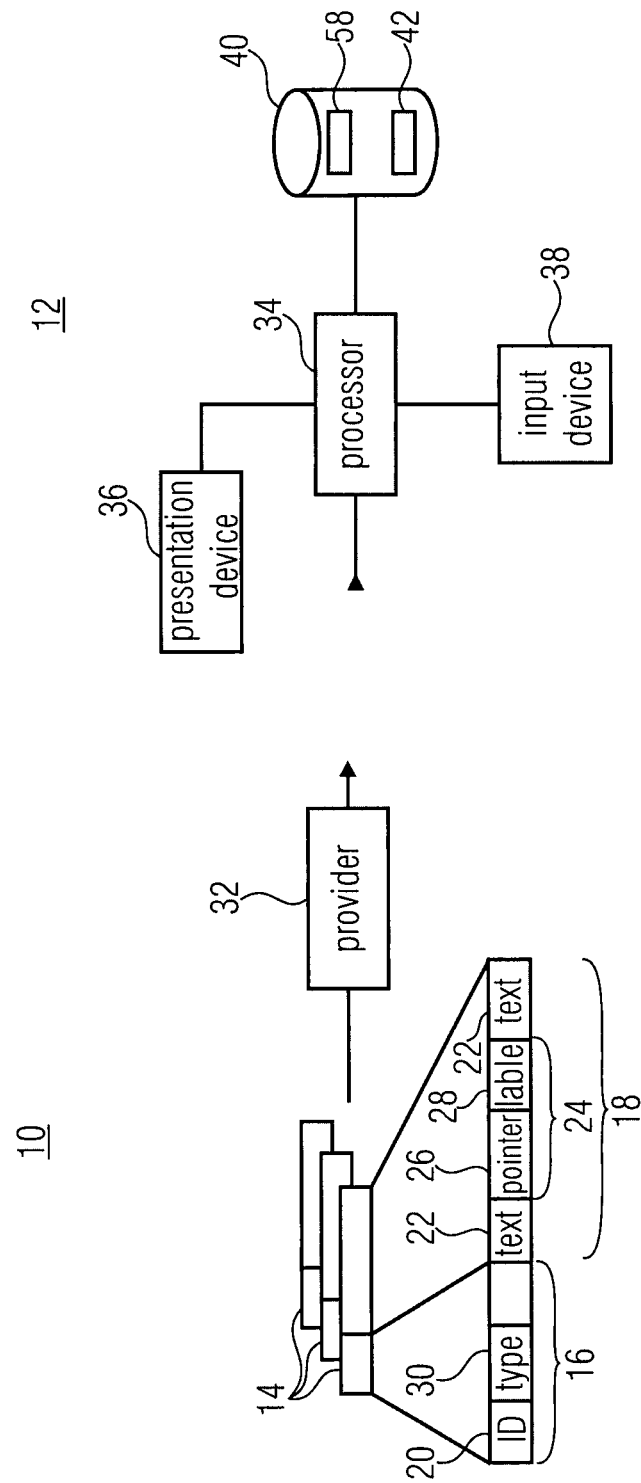
FIG. 1a a schematic diagram of an illustrative application-layer system.

FIG. 1a shows an application-layer system as an example where the present invention may be utilized. The application-layer system of FIG. 1a is a text-based information service system where a text-based information signal carrying text-based information content is provided from a transmission side 10 to a receiving side 12. The text-based information content may, for example, comprise news, advertisements or other textual information. The text-based information content is distributed to a plurality of information objects 14. As shown in FIG. 1a, each object may, for example, comprise an object header 15 and an object content section 18. Further, each object 14 may have associated therewith a unique object ID among a plurality of different object IDs. This object ID may, as shown in FIG. 1a, be contained within the object header, as shown at reference sign 20. The text-based content of the respective object 14 is contained by the object content section 18 as shown at 22. Some of the objects 14 may have links to other objects. Such a link item is shown in FIG. 1a at reference sign 24 as being included within the object content section 18. The link item 24 comprises a pointer 26 pointing or referring to an object ID different from the object ID 20 of the object to which pointer 26 belongs, as well as a label 28. Both text portions 22 as well as labels 28 are dedicated for being presented to the user at the receiving side 12. As it is described in more detail below, the user at the receiving side 12 is given the opportunity to activate the link item 24 represented by the label 28, thereby navigating from the current object with a current object ID 20 to the object to which the pointer 26 of the activated link item 24 refers. The latter aspect is described in more detail below with respect to FIG. 1b.

Of course, further syntax elements may be comprised by the object header 16 and/or the object content section 18 and/or the object itself. For example, the object header 16 may comprise the syntax element 30 specifying the type or structure of the object content section 18. For example, manual objects, pure text objects, list objects and so forth may be distinguished.

As shown in FIG. 1a, the transmission side 10 comprises a provider 32 being configured to provide the objects 14 to the receiving side. Provider 32 may be configured to provide the object 14 to the receiving side 12 in a data-carousel manner. That is, provider 32 may be configured to cycle through the object IDs wherein the repetition rate at which a certain object ID is visited, may be different between the individual object IDs. Alternatively, provider 32 may be configured to provide the objects 14 to the receiving side 12 on demand, i.e. responsive to a request from the receiving side 12 to provide a certain object with a determined object ID to the receiving side 12.

At the receiving side 12, a processor 34 is configured to receive the information objects 14 provided by provider 32 and to parse them and handle them according to the specification within the object header 16 as it is described in more detail below. Several devices are connected with processor 34. These devices comprise a presentation device 36, an input device 38 and a memory 40. In particular, processor 34 is configured to present the textual content within the object content section 18 of an object having a currently selected object ID 20 to the user via the presentation device 36. The presentation device 36 may, for example, comprise a display, such as a graphical display or text display. However, it is also possible that the presentation device 36 comprises a loudspeaker with processor 34 performing a text-to-speech conversion in presenting the textual content of an object to the user. If present, processor 34 presents the label 28 of link items 24 to the user. The user, in turn, is given the opportunity to activate or select such link item 24 presented via presentation device 36, by means of the input device 38. For example, the input device 38 may comprise a toggle switch such as, for example, a 4-toggle switch, or a rotating knob or may comprise a touch screen capability, or a combination thereof. Even a speech recognition input capability enabling speech control would be feasible. In particular, in case of more than one link item 24 being present in the currently selected and presented object, processor 34 may be configured to highlight an actually selectable link item among these link items with the user being able to, via the input device 38, change the currently selectable link item and activate the currently selectable link item, respectively. Responsive to a selection of a link item, processor 34 appoints the object ID referred to by the pointer 26 of the selected link item 24, as the newly-selected object ID and obtains an object with that object ID and presents its textual content to the user via the presentation device 36. In case of a data-carousel, processor 34 may obtain the object having the newly-selected object ID from the data-carousel text-based information signal provided by provider 32 or a precached version thereof stored within an object cache 42 within memory 40. Alternatively, processor 34 may obtain the information object 14 having the newly-selected object ID by requesting same from provider 32.

Figure 1B:
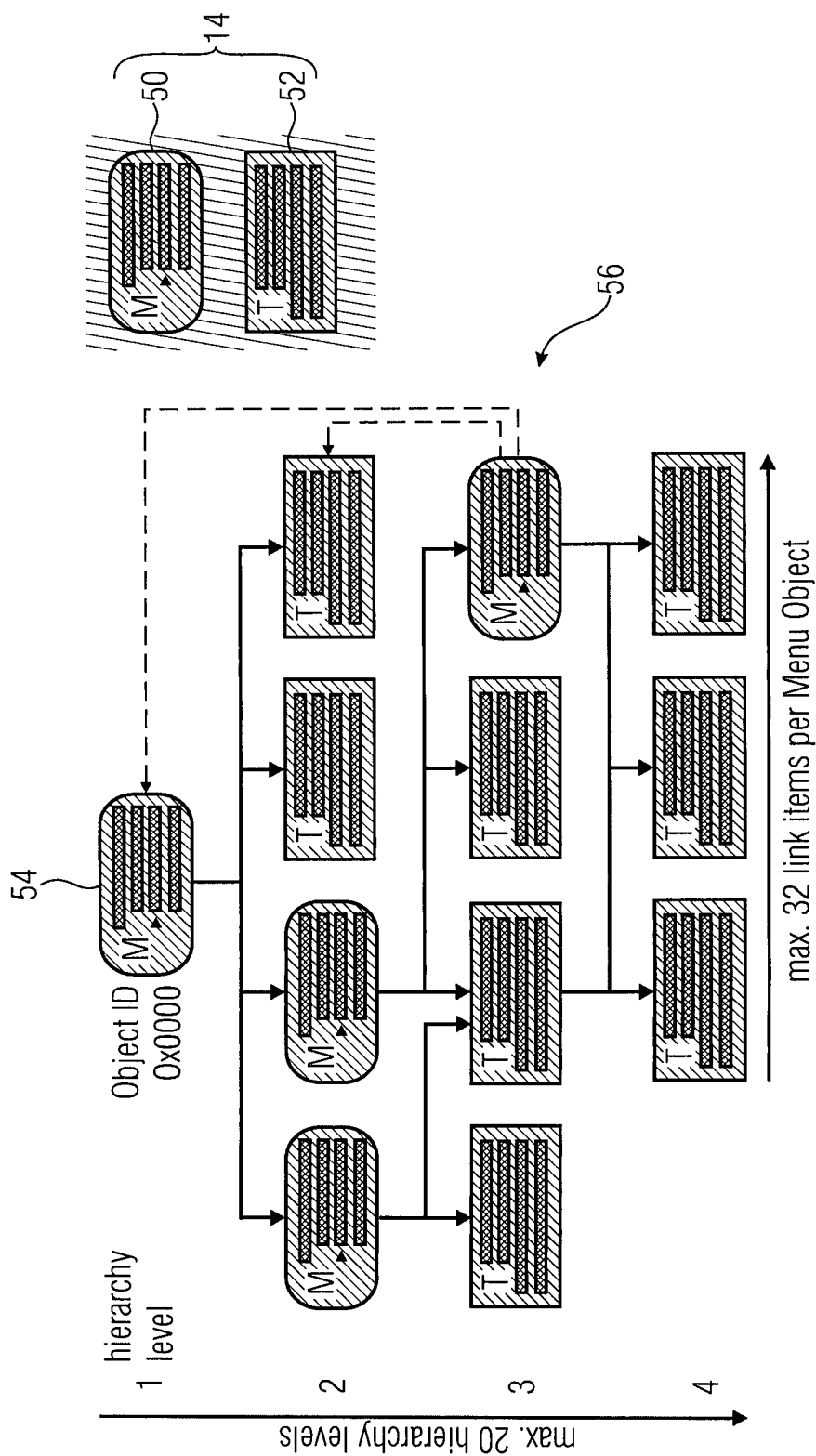
FIG. 1b a schematic diagram of a illustrative tree-structure of information objects.

In the above-described text-based information service system, the user is given the opportunity to navigate through the text-based information content of that service. To illustrate this, reference is made to FIG. 1*b*. FIG. 1*b* shows an illustrative tree structure of information objects 14, the tree structure being defined by the pointers 26 or link items 24. In particular, FIG. 1*b* distinguishes between objects 50 comprising one or more link items 24 which are illustrated by rectangles having rounded corners and being marked with "M", and objects 52 having right-angled corners being marked with "T". As already denoted above, each object 14 is assigned a unique object ID. In other words, the object 14 shown in FIG. 1*b* each has a unique object ID associated therewith, which is different from the object ID of any other object 14 as shown in FIG. 1*b*. One of the link objects 50 may be associated with a specific object ID which is, in case of FIG. 1*b*, exemplarily the object ID 0x0000. This object 54 forms a root of the tree structure 56 into which the objects 14 are structured by the pointers 28. A specific object ID of the root object 54 may be known at the receiving side 12 and may be initially presented to the user by processor 34 upon, for example, switching on processor 34. The root object 54 forms a first hierarchy level of the hierarchical tree structure 56. The pointers 26 of the link items 24 of the root object 54 point to objects 14 having different object IDs forming a second hierarchy level as illustrated by arrows starting from root object 54 and extending to objects 14 of the second hierarchy level. Objects 50 of the second hierarchy level in turn, have link items with pointers pointing to objects having a respective different object ID and so forth. The "hierarchy level" of an object 14 may be defined as the shortest possible path from the root object 54 to the respective object. Although the range of hierarchy levels may be unrestricted, according to an embodiment, the number of hierarchy levels may be restricted to a maximum value, such as 20 hierarchy levels. Similarly, the number of link items per object 50 may be unlimited or may be restricted to some maximum value. As shown in FIG. 1*b*, an object 14 may be referred to or pointed to by respective link items of more than one object 50. Further, the pointer of the link item of a certain object 50 is not restricted to point to an object of the subsequent hierarchy level. Rather, the object 50 of a certain hierarchy level may have a link item pointing to an object having a different object ID within a lower hierarchy level as it is illustrated by dotted lines in FIG. 1*b*.

With additional reference to FIG. 1*a*, processor 34 is configured to assist the user in navigating through the tree 56 of objects. In particular, processor 34 may be configured to monitor a data-carousel signal provided by provider 32 or may look-up in the object cache 42, to detect an object 14 having a currently selected object ID associated therewith and to render a presentation to the user representing the content of this information object via presentation device 36. If the currently presented object comprises a link item 24, the user is prompted to select this or to select one of the link items 24 of the currently presented object. In particular, the user is able to select one of several link items by use of the input device 38. Upon the selection of a certain link item by the user, processor 34 appoints the object ID referred to by this link item 24 as a newly-selected object ID, whereupon processor 34 monitors, for example, a data-carousel signal provided by provider 32 or a cached version thereof stored in cache 32, in order to present the textual content of this object to the user and so forth. As outlined before, according to an alternative embodiment, processor 34 requests a newly-selected object ID from provider 32 instead of using a data-carousel signal.

Processor 34 may use the memory 40 in order to keep track of the recently visited object IDs in their visiting order. In other words, processor 34 may store a path history 58 in memory 40, the path history 58 comprising a list of traversed object IDs when navigating from the route object 54 to any other object 14. The path history 58 may be restricted to a certain number of object IDs, with this number being, for example, equal to the maximum number of hierarchy levels or greater than the latter. Processor 34 may use the path history 58 in order to obtain the object ID of the object 50 from where the user reached the currently-displayed object, upon the user requesting returning to this previous object 50 by use of, for example, input device 38. Processor 34 may be configured to shorten the history path 58 in case a newly-selected object ID is already present in the path history 58. Further, processor 34 may be configured to remove the oldest or any other object ID from the path history 58 upon the number of different object IDs in the path history exceeding the maximum number.

The description above was restricted to the application-layer system. That is, the above description was restricted to the structure and the handling of the information object into which the text-based information content is distributed. FIGS. 2 and 3 show examples for a transmitter and receiver, respectively, which are configured to implement a text-based information service as described above with respect to FIGS. 1*a* and 1*b*, with the transmitter and receiver also comprising components concerning the transport layer. Thus, FIGS. 2 and 3 also show the interface between application layer on the one hand and transport layer on the other hand.

FIG. 2 shows an example of a transmitter 70. The transmitter 70 comprises an application layer unit 72 and a transport layer unit 74. The application layer unit comprises an object provider 74, which corresponds to or is functionally identical with provider 32 of FIG. 1a. Further, application layer unit 72 comprises a fragmenter 76 and a header adder 78. Object provider 74, fragmenter 76 and header adder 78 are connected in series to transport layer unit 74, in the order mentioned.

As already described above with respect to FIG. 1a, object provider 74 provides objects 14 and outputs them to fragmenter 76. In the example of FIG. 2, each object comprises in addition to object header 16 and object content section 18 additional data, namely an additional header 80 and redundancy data 82. Object 14 may be, for example, a MSC data group with the additional header 80 being an MSC data group header, the redundancy data 82 being an redundancy code word determined from and enabling error detection or, alternatively, even error correction of MSC data group header 80, as well as the MSC data group field consisting of object header 16 and object content section 18. In addition to the information contained in object header 16, MSC data group header 80 may identify the text-based information service to which the textual content within the object content section 18 belongs, in order to enable to distinguish information object 14 from objects belonging to another service. It should, however, be emphasized that the just-mentioned portions 80 and 82 are merely optional and may be left off. Further, although in FIG. 2 portions 80 and 82 are described to be included within the information object 14, it would also be possible to interpret the information object 14 to be restricted to the data group field of an MSC data group only with the reference sign 14 of FIG. 2 then, denoting an MSC data group. As, however, sections 80 and 82 are merely optional, the units provided by object provider 74 are denoted information objects 14 as a whole.

Thus, fragmenter 76 receives data from object provider 74 in units of information objects 14. In particular, fragmenter 76 receives a sequence of information objects 14 from object provider 74. The fragmenter 76 is responsible for guaranteeing that the transport layer unit 71 is able to handle the transport and packetizing of the information objects 14. To this end, fragmenter 76 checks as to whether the information object 14 exceeds a predetermined length which, in turn, may be predetermined or may be, in a time-varying manner, prescribed by the transport layer unit 74 depending on physical circumstances such as a current physical channel situation or the like. If the fragmenter 76 determines that the length of a current information object 14 exceeds the threshold length, then fragmenter 76 splits-up the information object into a sequence of fragments 14a and 14b so as to be, for example, as long as possible as allowed by the threshold length, thus forming a sub-sequence of a sequence of fragment sections at the output of fragmenter 76 for this information object 14. As just mentioned, the fragments sections belonging to the same object may have different lengths—not only the last one relative to the preceding ones but also the fragment sections preceding the last one, may differ in length among each other.

Header adder 78 receives the sequence of fragment sections and provides each fragment section with an associated fragment header 84a and 84b, respectively, enabling, by solely relying on the fragment headers 84a and 84b, a de-fragmentation of fragment sections 14a, 14b to reconstruct the sequence of information objects 14 from the sequence of fragment sections 14a and 14b. In particular, the fragment headers 84a, 84b may be determined such that same indicate as to whether the fragment section they belong to, is the first fragment section of a sub-sequence of fragment sections forming, together, an information object, as to whether the fragment section it belongs to, is the last fragment section of a sub-sequence of fragment sections forming, together, an information object, and enable to check, solely based on the fragment headers, as to whether the fragment sections completely reconstruct the information object or as to whether a fragment section is missing.

As shown in FIG. 2, each fragment header 84a, 84b may, for example, comprise a first-flag, a last-flag 88 and a continuity index 90. The first flag 86 may be enabled if the fragment section 14a comprises a first fragment of an information object 14 with, otherwise being disabled. Similarly, the last-flag 88 may be enabled if the fragment section 14a associated with fragment header 84a comprises a last fragment of an information object, with, otherwise, being disabled. A continuity index 90, in turn, may comprise a counter that starts from zero at fragment sections 14a comprising the first fragment of an information object and is incremented by one for each subsequent fragment section 14b comprising a fragment of this information object. The first-flag 86 and last-flag 88 may be one-bit symbols. The continuity index 90 may, for example, be a six-bit counter value. If an information object is fragmented in more than $2^6=64$ fragment sections, the counter may overflow or re-start at zero which could be regarded as normal behaviour at the receiving side as will be described in more detail below.

In the following, an example for a sequence of fragment headers is listed for the illustrative case that three consecutive information objects are fragmented into one, four and two fragments, respectively.

| First flag | Last flag | Continuity index |
|---|---|---|
| 1 | 1 | 000000 |
| 1 | 0 | 000000 |
| 0 | 0 | 000001 |
| 0 | 0 | 000010 |
| 0 | 1 | 000011 |
| 1 | 0 | 000000 |
| 0 | 1 | 000001 |

Figure 4A:
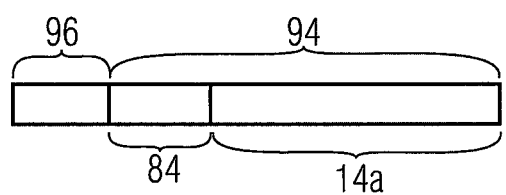
FIGS. 4a and b, schematic diagrams of exemplary ways of transporting the fragment sections plus associated fragment header.
Figure 4B:
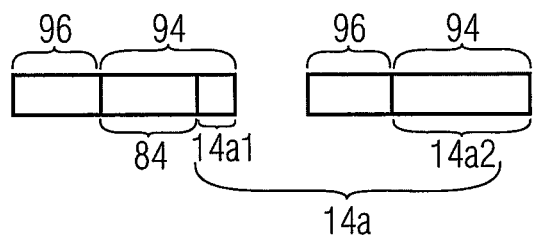

The transport layer unit 74 receives the sequence of fragment sections 14a and 14b each having associated therewith a fragment header 84a and 84b, respectively, and assumes responsibility for the transportation to the receiving side. Due to the fragmentation performed by the fragmenter 76 and header adder 78, the transport layer unit 74 is not restricted to one being able to cope with the maximum length of the information objects 14. Rather, a transport layer unit 74 may use any transport layer scheme available. For example, the size limit for the information object 14, such as in form of MSC data groups, may be 4 kb. Thus, without fragmenter 76 and header adder 78, a transport layer unit 74 would have to be able to cope with objects of that size. Due to the fragmentation, however, the transport layer unit 74 is not restricted to such a transport layer scheme. For example, the transport layer unit 74 may, in this case, use any of the DAB, DRM, HD radio, Worldspace or any other transport layer system. In fact, the transport layer unit 74 forms a transport signal 92 out of the sequence of fragment sections 14a, 14b with the associated fragment headers 84a, 84b in any possible way with, however, logically maintaining the structure of this incoming sequence into the units or fragment section plus fragment header. For example, as shown in FIG. 4a, a transport layer unit 74 may packetize each fragment section plus as associated fragment header, i.e. each transport unit, individually into one transport packet content section 94 having, itself, a transport packet header 96 associated therewith. Alternatively, the transport layer unit 92 transports the sequence of fragment sections plus fragment headers as a stream with synchronization headers indicating the borders between consecutive pairs of fragment section and associated fragment header. Even alternatively, the transport layer unit 74 may be able to transport a pair of fragment section plus fragment header distributed to more than one transport packets as illustrated in FIG. 4b. The data transfer itself, may be performed in any way such as in form of a terrestrial signal 92 or a satellite signal or the like. Moreover, as already denoted above, the data transmission 92 may be a broadcast signal such as, for example, a wireless transmission broadcast signal, or the transmission aims to specific recipients indicated by a respective address such as, for example, in case of sending the objects on demand.

FIG. 3 shows a possible receiver for receiving a transport signal 92. The receiver of FIG. 3 comprises a transport layer unit 110 and an application layer unit 112 with the latter comprising an extractor 114, a de-fragmenter 116 and an object handler 118 with the object handler comprising, for example, processor 34 or processor 34 of FIG. 1a and one or more of the elements connected therewith, as shown in FIG. 1a.

The transport layer unit 110 receives a transport signal and reconstructs therefrom a sequence of transport units with each transport unit corresponding or being equal to a pair of fragment headers plus fragment section. The application layer unit 112 of the receiver of FIG. 3 has the de-fragmenter 116 being connected between the extractor 114 and the object handler 118. Extractor 114 receives from the transport layer unit 110 the sequence of transport units and extracts therefrom for each transport unit a respective fragment header 120 and fragment section 122. The de-fragmenter 116, in turn, de-fragments the forwarded sequence of the fragment sections by use of the fragment headers to obtain the information objects with, at least, for a part of the information objects, composing the respective information object 14 from the respective sub-sequence of fragment sections. The object handler 118, in turn, uses the thus obtained information objects 14 in the way already discussed above with respect to FIGS. 1a and 1b.

In particular, the fragmenter 116 uses the fragment headers in order to check as to whether a fragment of a fragmented information object 14 has become lost somewhere between the transport layer unit 74 of the transmitter and the transport layer unit 110 of the receiver. To this end, the de-fragmenter 116 firstly checks the fragment header of a current fragment section of a current transport unit received from transport layer unit 110 as to whether the associated fragment section comprises a first fragment of an information object. If so, the fragmenter 116 checks the fragment header of the current fragment section as well as the fragment headers associated with a run of fragment sections immediately succeeding the current fragment section as to whether there is a discontinuity indicating that a fragment is missing thereby preventing rebuilding or composing an information object having been fragmented. The afore-mentioned run of consecutive fragment sections is determined to end either at a fragment section preceding a fragment section with a fragment header indicating that its fragment section comprises a first fragment of an information object, or at a fragment section having a fragment header associated therewith which indicates that the respective fragment section comprises a last fragment of an information object, whatever occurs first in the sequence of fragment sections. Both conditions normally apply as can be seen, for example, from the fifth and sixth fragment headers in the above table among which the fifth fragment header belongs to fragment section forming the just-mentioned run end.

In order to illustrate this in more detail, reference is made to the above exemplified list of fragment headers. Imagine, for example, the current fragment section is the one having the second fragment header in this table. if none of the fragment sections with associated fragment header is lost, the run of consecutive fragment sections extends from the third to fifth fragment header/fragment section pair as the fifth fragment header has the last-flag enabled. If, however, the fifth fragment header plus fragment section would have been lost in transmission, for example, the run of consecutive fragment sections mentioned before would end at the fourth fragment section as this fragment section precedes the immediately following sixth fragment header having the first-flag enabled, and since the first fragment header having the last-flag enabled follows even later.

If the check reveals that some intermediate fragment section has been lost of the afore-mentioned run or the run ends at a fragment section that immediately precedes a fragment section having a fragment header with the first-flag being enabled, but that has a fragment header the last-flag of which is not enabled, the fragmenter 116 discards the current fragment section plus the run of immediately following fragment sections and resumes the de-fragmentation of the fragment section immediately following the run of fragment sections.

If, however, the check result is that no fragment is missing, the fragmenter 116 composes the information object from the current fragment section and the run of immediately following fragment sections. Optionally, the fragmenter 116 checks the redundancy information 82 in order to determine as to whether the information object re-composed is correct.

As a further escape mechanism, the fragmenter 116 may limit the length of run of consecutive fragment sections such that the maximum size for information objects is still fulfilled. If, for example, the fragment section having a fragment header having the first-flag being enabled, is followed by a run of fragment sections ending as defined above, has a sum of the length of these fragment sections exceeding the maximum length for the information objects, it is clear that these fragments belong to different information objects and that any fragment section have been lost. In this case, the fragmenter stops the assembly of fragments at this maximum size, such as at 4 kb, and discards the fragment sections processed so far to resume the processing as denoted above with the next fragment section with a fragment header having the first-flag enabled.

In particular, when using the type of fragment header having a first-flag, a last-flag and a continuity index 90, the fragmenter 116 may operate as follows. Firstly, the de-fragmenter 116 may wait for the first-flag being enabled. Then, the fragmenter 116 starts collecting the fragment sections. Continuously, the fragmenter 116 checks the continuity index of the following fragment headers in order to check as to whether there is a discontinuity in the counter indicated by the continuity index 90. If there is a discontinuity detected, the fragmenter 116 discards all fragments and restarts the operation with the next fragment header having a first-flag enabled. If there is a first-flag detected, the fragmenter 116 knows that a fragment header with the last-flag being enabled has been missed, and therefore, the fragmenter 116 discards the fragment sections collected so far and restarts with the next fragment header having a first-flag being enabled. If, however, the fragmenter 116 reaches the fragment header having a last-flag being enabled before the first occurrence of a fragment header with the first-flag being enabled, the fragmenter 116 passes on the information object 14 composed from the collected fragment sections to the object handler which, in turn, checks, optionally, the redundancy information 82 and, if correct, further processes the information object according to application layer preferences as briefly described above. As indicated above, the collection may be interrupted as soon as the sum of currently collected fragment section lengths exceeds the limit for information objects.

It is noted that the present invention is neither restricted to carousel based data transmission nor broadcasting. Rather, as was already indicated above, differing from the above outlined description, the embodiments outlined above may also be applied to data transmissions where the data objects are transferred on demand. Similarly, differing from the above outlined description, the above embodiments may be transferred to address-based data transmissions directed to specified addressees which may or may not ordered the transmission by demand.

In other words, in accordance with an embodiment of the present invention, a receiver for a text-information signal carrying text-based information content being distributed to information objects, may comprise a transport-layer unit for receiving a transport signal so as to obtain a sequence of transport units and an application-layer unit. The application-layer unit comprises an extractor for inspecting each transport unit and extracting a fragment header and a corresponding fragment section therefrom so as to obtain a sequence of fragment sections with associated fragment headers, a de-fragmenter for de-fragmenting the sequence of fragment sections by use of the fragment headers to obtain the information objects with, at least for a part of the information objects, composing the respective information object from a sub-sequence of fragment sections of the sequence of fragment sections, and an information object handler for parsing the information object to obtain an object header and an object content section and processing the information objects according to the object header. Optionally, the transport signal may have each transport unit contained therein in a packetized form distributed to one or more than one transport packet, each transport packet comprising a transport packet header and a transport packet data section, wherein the transport-layer unit may be configured to inspect, for each transport packet, the transport packet header in order to obtain a payload extraction information on a length of the transport content section or on a payload portion within the transport packet section and to extract and forward, by use of the payload extraction information, merely bits of the transport packet to the application-level unit, which concern at least one of the fragment header and the fragment section.

Similarly, in accordance with an embodiment of the present invention, a transmitter for a text-based information signal carrying text-based information content being distributed to information objects, may comprise an application-layer unit and a transport-layer unit. The application-layer unit may comprise a fragmenter for fragmenting the information objects into a sequence of fragment sections with, at least for a part of the information objects, fragmentising the respective information objects into a sub-sequence of fragment sections of the sequence of fragment sections, and a header adder for providing each fragment section with a fragment header allowing a de-fragmentation of the fragment sections to obtain the information objects, each fragment section and the fragment header the respective fragment section is associated with, forming a transport unit. The transport-layer unit is responsible for transmitting, transport unit-wise, the sequence of transport units within a transport signal. Optionally, the transport-layer unit may be configured to transmit the sequence of transport units within the transport signal such that the transport signal has each transport unit contained therein in a packetized form distributed to one or more than one transport packet, each transport packet comprising a transport packet header and a transport packet data section, the transport packet header comprising a payload extraction information on a length of the transport content section or on a payload portion within the transport packet section indicating the bits of the transport packet which concern at least one of the fragment header and the fragment section.

Depending on an actual implementation, the inventive broadcast concept can be implemented in hardware or in software. Therefore, the present invention also relates to a computer program, which can be stored on a computer-readable medium such as a CD, a disk, DVD, a memory stick, a memory card or a memory chip. The present invention is, therefore, also a computer program having a program code which, when executed on a computer, performs the inventive method described in connection with the above figures.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

Furthermore, it is noted that all steps indicated in the flow diagrams are implemented by respective means in the receiver, transmitter and units, respectively, and that the implementations may comprise subroutines running on a CPU, circuit parts of an ASIC or the like.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. Receiver for a text-information signal carrying text-based information content being distributed to information objects, comprising:
   a transport-layer receiver configured to receive a transport signal so as to acquire a sequence of transport units;
   an application-layer receiver comprising:
      an extractor configured to inspect each transport unit and extract a fragment header and a corresponding fragment section therefrom so as to acquire a sequence of fragment sections with associated fragment headers;
      a de-fragmenter configured to de-fragment the sequence of fragment sections by use of the fragment headers to acquire the information objects with, at least for a part of the information objects, composing the respective information object from a sub-sequence of fragment sections of the sequence of fragment sections; and
      an information object handler configured to parse the information object to acquire an object header and an object content section and processing the information objects according to the object header, wherein the fragment headers associated with the sequence of the fragment sections are configured such that the fragment headers reveal as to whether the associated fragment section is the first fragment section of a sub-sequence of fragment sections into which an information object is fragmented;

the fragment headers reveal as to whether the associated fragment section is the last fragment section of a sub-sequence of fragment sections into which an information object is fragmented; and the fragment headers of a sub-sequence of fragment sections into which an information object is fragmented comprise a continuity index continuously changing from the first to the last fragment section of the sub-sequence of fragment sections, wherein the de-fragmenter is configured to perform the de-fragmentation by a) checking the fragment header with which a current fragment section is associated as to whether the current fragment section is the first fragment section of a sub-sequence of fragment sections, b) if so, check the fragment header of the current fragment section and the fragment headers associated with a run of fragment sections immediately following the current fragment section and ending at the fragment section immediately preceding a fragment section comprising a fragment header associated therewith which indicates that its fragment section is the first fragment section of a sub-sequence of fragment sections, or at a fragment section that comprises a fragment header associated therewith that indicates that its fragment section is the last fragment section of a sub-sequence of fragment sections, whatever occurs first in the sequence of fragment sections, as to whether there is a discontinuity in the continuity index of these fragment headers;

c) if there is a discontinuity in the continuity index of these fragment headers or if the run ends at a fragment section that comprises a fragment header associated therewith that does not indicate that its fragment section is the last fragment section of a sub-sequence of fragment sections, discarding the current fragment section on the run of fragment sections and resuming the de-fragmentation at step a) with the fragment section immediately following the run of fragment sections as the current fragment section; and d) otherwise, composing the information object from the current fragment section and the run of fragment sections, wherein the transport signal has each transport unit contained therein in a packetized form distributed onto one or more than one transport packet, each transport packet comprising a transport packet header and a transport packet data section, wherein the transport-layer receiver is configured to inspect, for each transport packet, the transport packet header in order to obtain a payload extraction information on a length of the transport content section or on a payload portion within the transport packet section and to extract and forward, by use of the payload extraction information, merely bits of the transport packet to the application-level receiver, which concern at least one of the fragment header and the fragment section.

2. Receiver according to claim 1, wherein the de-fragmenter is configured to perform the de-fragmentation by checking, solely based on the fragment headers, as to whether the fragment sections completely reconstruct the information object which is fragmented into the sub-sequence of fragment sections or as to whether a fragment section of the sub-sequence of fragment sections is missing.

3. Receiver according to claim 2, wherein the fragment headers associated with the sequence of the fragment sections are configured such the continuity index continuously changes from the first to the last fragment section of the sub-sequence of fragment sections with starting from zero at the first fragment section of the sub-sequence of fragment sections.

4. Receiver according to claim 1, wherein the application layer receiver and the transport layer receiver belong to different OSI layers.

5. Receiver according to claim 1, wherein the information object handler is configured to, in processing the information objects according to the object header, survey a data carousel formed by the information objects and step through a tree of text massages respectively contained in the content sections of the information objections and inter-linked to each other via information object addresses in the object headers responsive to user input of a user of the receiver.

6. Receiver according to claim 5, wherein the application layer receiver belongs to an OSI application layer and the transport layer receiver belongs to a OSI transport layer.

7. Transmitter for a text-based information signal carrying text-based information content being distributed to information objects, comprising:

an application-layer transmitter comprising:

a fragmenter configured to fragment the information objects into a sequence of fragment sections with, at least for a part of the information objects, fragmentising the respective information objects into a sub-sequence of fragment sections of the sequence of fragment sections; and a header adder configured to provide each fragment section with a fragment header allowing a de-fragmentation of the fragment sections to acquire the information objects, each fragment section and the fragment header the respective fragment section is associated with, forming a transport unit, wherein the header adder is configured such that fragment headers associated with the sequence of the fragment sections are configured such that the fragment headers reveal as to whether the associated fragment section is the first fragment section of a sub-sequence of fragment sections into which an information object is fragmented;

the fragment headers reveal as to whether the associated fragment section is the last fragment section of a sub-sequence of fragment sections into which an information object is fragmented; and the fragment headers of a sub-sequence of fragment sections into which an information object is fragmented comprise a continuity index continuously changing from the first to the last fragment section of the sub-sequence of fragment sections; and a transport-layer transmitter configured to for transmit, transport unit-wise, the sequence of transport units within a transport signal, wherein the transport-layer transmitter is configured to transmit the sequence of transport units within the transport signal such that the transport signal has each transport unit contained therein in a packetized form distributed onto one or more than one transport packet, each transport packet comprising a transport packet header and a transport packet data section, the transport packet header comprising a payload extraction information on a length of the transport content section or on a payload portion within the transport packet section indicating the bits of the transport packet which concern at least one of the fragment header and the fragment section.

8. Transmitter according to claim 7, wherein the application layer transmitter and the transport layer transmitter belong to different OSI layers.

9. Transmitter according to claim 7, wherein the application layer transmitter is configured to form a data carousel by the information objects so that a tree of text massages is defined by the data carousel with the each text message contained in a respective one of the content sections of the information objections, the text messages being inter-linked to each other via information object addresses in the object headers.

10. Transmitter according to claim 9, wherein the application layer transmitter belongs to an OSI application layer and the transport layer transmitter belongs to a OSI transport layer.

11. Method for receiving a text-information signal carrying text-based information content being distributed to information objects in form of a sequence of transport units comprising:
at transport layer level,
receiving a transport signal so as to obtain a sequence of transport units;
at application layer level,
inspecting each transport unit and extracting a fragment header and a corresponding fragment section therefrom so as to acquire a sequence of fragment sections with associated fragment headers;
de-fragmenting the sequence of fragment sections by use of the fragment headers to acquire the information objects with, at least for a part of the information objects, composing the respective information object from a sub-sequence of fragment sections of the sequence of fragment sections; and
parsing the information object to acquire an object header and an object content section and processing the information objects according to the object header,
wherein the fragment headers associated with the sequence of the fragment sections are configured such
that the fragment headers reveal as to whether the associated fragment section is the first fragment section of a sub-sequence of fragment sections into which an information object is fragmented;
the fragment headers reveal as to whether the associated fragment section is the last fragment section of a sub-sequence of fragment sections into which an information object is fragmented; and
the fragment headers of a sub-sequence of fragment sections into which an information object is fragmented comprise a continuity index continuously changing from the first to the last fragment section of the sub-sequence of fragment sections,
wherein the de-fragmentation is performed by
a) checking the fragment header with which a current fragment section is associated as to whether the current fragment section is the first fragment section of a sub-sequence of fragment sections,
b) if so, check the fragment header of the current fragment section and the fragment headers associated with a run of fragment sections immediately following the current fragment section and ending at the fragment section immediately preceding a fragment section comprising a fragment header associated therewith which indicates that its fragment section is the first fragment section of a sub-sequence of fragment sections, or at a fragment section that comprises a fragment header associated therewith that indicates that its fragment section is the last fragment section of a sub-sequence of fragment sections, whatever occurs first in the sequence of fragment sections, as to whether there is a discontinuity in the continuity index of these fragment headers;
c) if there is a discontinuity in the continuity index of these fragment headers or if the run ends at a fragment section that comprises a fragment header associated therewith that does not indicate that its fragment section is the last fragment section of a sub-sequence of fragment sections, discarding the current fragment section on the run of fragment sections and resuming the de-fragmentation at step a) with the fragment section immediately following the run of fragment sections as the current fragment section; and
d) otherwise, composing the information object from the current fragment section and the run of fragment sections,
wherein the transport signal has each transport unit contained therein in a packetized form distributed onto one or more than one transport packet, each transport packet comprising a transport packet header and a transport packet data section, wherein the method for comprises, at transport layer, inspecting, for each transport packet, the transport packet header in order to obtain a payload extraction information on a length of the transport content section or on a payload portion within the transport packet section and extracting and forwarding, by use of the payload extraction information, merely bits of the transport packet to the application-layer level, which concern at least one of the fragment header and the fragment section.

12. Method for transmitting a text-based information signal carrying text-based information content being distributed to information objects in form of a sequence of transport units within a transport signal, comprising:
at application layer level,
fragmenting the information objects into a sequence of fragment sections with, at least for a part of the information objects, fragmentising the respective information objects into a sub-sequence of fragment sections of the sequence of fragment sections; and
providing each fragment section with a fragment header allowing a de-fragmentation of the fragment sections to acquire the information objects, each fragment section and the fragment header the respective fragment section is associated with, forming a transport unit,
wherein the provision of each fragment section with a fragment header is performed such that fragment headers associated with the sequence of the fragment sections are configured such
that the fragment headers reveal as to whether the associated fragment section is the first fragment section of a sub-sequence of fragment sections into which an information object is fragmented;
the fragment headers reveal as to whether the associated fragment section is the last fragment section of a sub-sequence of fragment sections into which an information object is fragmented; and
the fragment headers of a sub-sequence of fragment sections into which an information object is fragmented comprise a continuity index continuously changing from the first to the last fragment section of the sub-sequence of fragment sections; and at transport-layer level,
transmitting, transport unit-wise, the sequence of transport units within a transport signal,
wherein the method comprises, in the transport-layer level, transmitting the sequence of transport units within the transport signal such that the transport signal has each transport unit contained therein in a packetized form distributed onto one or more than one transport packet, each transport packet comprising a transport packet header and a transport packet data section, the transport packet header comprising a payload extraction information on a length of the transport content section or on a payload portion within the transport packet section indicating the bits of the transport packet which concern at least one of the fragment header and the fragment section.

13. Computer-readable non-transitory storage medium having stored thereon a computer program comprising instructions for performing, when running on a computer, a method for receiving a text-information signal carrying text-based information content being distributed to information objects in form of a sequence of transport units comprising:
at transport layer level,
receiving a transport signal so as to obtain a sequence of transport units;
at application layer level,
inspecting each transport unit and extracting a fragment header and a corresponding fragment section therefrom so as to acquire a sequence of fragment sections with associated fragment headers;
de-fragmenting the sequence of fragment sections by use of the fragment headers to acquire the information objects with, at least for a part of the information objects, composing the respective information object from a sub-sequence of fragment sections of the sequence of fragment sections; and
parsing the information object to acquire an object header and an object content section and processing the information objects according to the object header,
wherein the fragment headers associated with the sequence of the fragment sections are configured such
that the fragment headers reveal as to whether the associated fragment section is the first fragment section of a sub-sequence of fragment sections into which an information object is fragmented;
the fragment headers reveal as to whether the associated fragment section is the last fragment section of a sub-sequence of fragment sections into which an information object is fragmented; and
the fragment headers of a sub-sequence of fragment sections into which an information object is fragmented comprise a continuity index continuously changing from the first to the last fragment section of the sub-sequence of fragment sections,
wherein the de-fragmentation is performed by
a) checking the fragment header with which a current fragment section is associated as to whether the current fragment section is the first fragment section of a sub-sequence of fragment sections,
b) if so, check the fragment header of the current fragment section and the fragment headers associated with a run of fragment sections immediately following the current fragment section and ending at the fragment section immediately preceding a fragment section comprising a fragment header associated therewith which indicates that its fragment section is the first fragment section of a sub-sequence of fragment sections, or at a fragment section that comprises a fragment header associated therewith that indicates that its fragment section is the last fragment section of a sub-sequence of fragment sections, whatever occurs first in the sequence of fragment sections, as to whether there is a discontinuity in the continuity index of these fragment headers;
c) if there is a discontinuity in the continuity index of these fragment headers or if the run ends at a fragment section that comprises a fragment header associated therewith that does not indicate that its fragment section is the last fragment section of a sub-sequence of fragment sections, discarding the current fragment section on the run of fragment sections and resuming the de-fragmentation at step a) with the fragment section immediately following the run of fragment sections as the current fragment section; and
d) otherwise, composing the information object from the current fragment section and the run of fragment sections,
wherein the transport signal has each transport unit contained therein in a packetized form distributed onto one or more than one transport packet, each transport packet comprising a transport packet header and a transport packet data section, wherein the method for comprises, at transport layer level, inspecting, for each transport packet, the transport packet header in order to obtain a payload extraction information on a length of the transport content section or on a payload portion within the transport packet section and extracting and forwarding, by use of the payload extraction information, merely bits of the transport packet to the application-layer level, which concern at least one of the fragment header and the fragment section.

14. Computer-readable non-transitory storage medium having stored thereon a computer program comprising instructions for performing, when running on a computer, a method for transmitting a text-based information signal carrying text-based information content being distributed to information objects in form of a sequence of transport units within a transport signal, comprising:
at an application layer level,
fragmenting the information objects into a sequence of fragment sections with, at least for a part of the information objects, fragmentising the respective information objects into a sub-sequence of fragment sections of the sequence of fragment sections; and
providing each fragment section with a fragment header allowing a de-fragmentation of the fragment sections to acquire the information objects, each fragment section and the fragment header the respective fragment section is associated with, forming a transport unit,
wherein the provision of each fragment section with a fragment header is performed such that fragment headers associated with the sequence of the fragment sections are configured such
that the fragment headers reveal as to whether the associated fragment section is the first fragment section of a sub-sequence of fragment sections into which an information object is fragmented;
the fragment headers reveal as to whether the associated fragment section is the last fragment section of a sub-sequence of fragment sections into which an information object is fragmented; and
the fragment headers of a sub-sequence of fragment sections into which an information object is fragmented comprise a continuity index continuously changing from the first to the last fragment section of the sub-sequence of fragment sections; and at transport-layer level, transmitting, transport unit-wise, the sequence of transport units within a transport signal, wherein the method comprises, in the transport-layer level, transmitting the sequence of transport units within the transport signal such that the transport signal has each transport unit contained therein in a packetized form distributed onto one or more than one transport packet, each transport packet comprising a transport packet header and a transport packet data section, the transport packet header comprising a payload extraction information on a length of the transport content section or on a payload portion within the transport packet section indicating the bits of the transport packet which concern at least one of the fragment header and the fragment section.

* * * * *